US012481738B2

(12) United States Patent
Trivedi et al.

(10) Patent No.: US 12,481,738 B2
(45) Date of Patent: Nov. 25, 2025

(54) QUANTUM REFLECTION ACCESS CREDENTIALING (QRAC)

(71) Applicant: Bank of America Corporation, Charlotte, NC (US)

(72) Inventors: Manil Trivedi, South Riding, VA (US); Adam King, Fort Mill, SC (US); Camilla Tyborowski, Buffalo Grove, IL (US); Robert Hannon Sparks, Euless, TX (US); Tarani Avasarala, Aurora, CO (US); William R. Overhultz, Lancaster, SC (US); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 18/139,105

(22) Filed: Apr. 25, 2023

(65) Prior Publication Data
US 2024/0362306 A1   Oct. 31, 2024

(51) Int. Cl.
*H04L 29/06* (2006.01)
*G06F 21/32* (2013.01)

(52) U.S. Cl.
CPC .................... *G06F 21/32* (2013.01)

(58) Field of Classification Search
CPC .......................................................... G06F 21/32
See application file for complete search history.

(56) References Cited

U.S. PATENT DOCUMENTS

| 2013/0315395 | A1* | 11/2013 | Jacobs | H04L 9/0852 380/278 |
| 2021/0358244 | A1* | 11/2021 | Chafni | G07C 9/257 |
| 2021/0377262 | A1* | 12/2021 | Butler | G06F 21/32 |

OTHER PUBLICATIONS

Lib, O., Bromberg, Y., "Quantum light in complex media and its applications," Nat. Phys. 18, 986-993 (2022). https://doi.org/10.1038/s41567-022-01692-y.

* cited by examiner

*Primary Examiner* — Wasika Nipa
(74) *Attorney, Agent, or Firm* — Weiss & Arons LLP

(57) ABSTRACT

A method for providing a quantum reflection access credentialing (QRAC) system. The method includes receiving a user login. The user login may include a username and password. The user login may be associated with a known user. The system may include a memory for storing information corresponding to light reflected from the face of the user. The method may further include selecting, or receiving a selection of, a light source from among an array of light sources. The method may also include shining light generated by the selected light source on the user's face. The method may also include scanning the user face to capture a reflection of the light generated by the light source. The method may then include confirming that the information stored in the memory corresponds to the reflection of the light generated by the light source. In response to confirming that the information stored in the memory corresponds to the reflection of the light generated by the light source, the method may credential user access.

14 Claims, 5 Drawing Sheets

QUANTUM REFLECTION ACCESS CREDENTIALING (QRAC)

FIELD OF TECHNOLOGY

Aspects of the disclosure relate to access-credentialing apparatus and schemes.

BACKGROUND OF THE DISCLOSURE

Password length and complexity are ever-changing. Unless prompted by a password management policy, users typically keep the same or similar passwords for access purposes. Password managers often create the opportunity to generate new and unique passwords per access purpose. However, the entities themselves are subject to threat actors.

As such it would be desirable to provide more advanced access schemes that enable a user to be protected without burdening the user with the dual tasks of knowledge and protection of additional and/or more complicated passwords.

It would be further desirable to provide access schemes that increase the security of the access schemes by deriving a password or other access key from the biometrics of the user.

It would be yet further desirable to mine a user's biometric in a way that is non-transparent to an onlooker or other observer.

SUMMARY OF THE DISCLOSURE

A quantum reflection access credentialing (QRAC) system includes an array of light sources. The system also includes a processor. The processor is in electrical communication with the array of light sources. The processor may be used to select one or more light sources from among the array of light sources. Following the selecting, the processor may initiate an access-credentialing session with a user. The user may be associated with a user face, the session may be initiated by transmitting light to the user face. The processor may be further configured to receive, from the user face, reflections and/or refractions of the light. The processor may receive the reflections and/or refractions using a camera. The processor may further form a user key based on the received reflections. The processor may compare the user key to a stored master key. When the user key matches the stored master key, the processor may authorize access for the user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
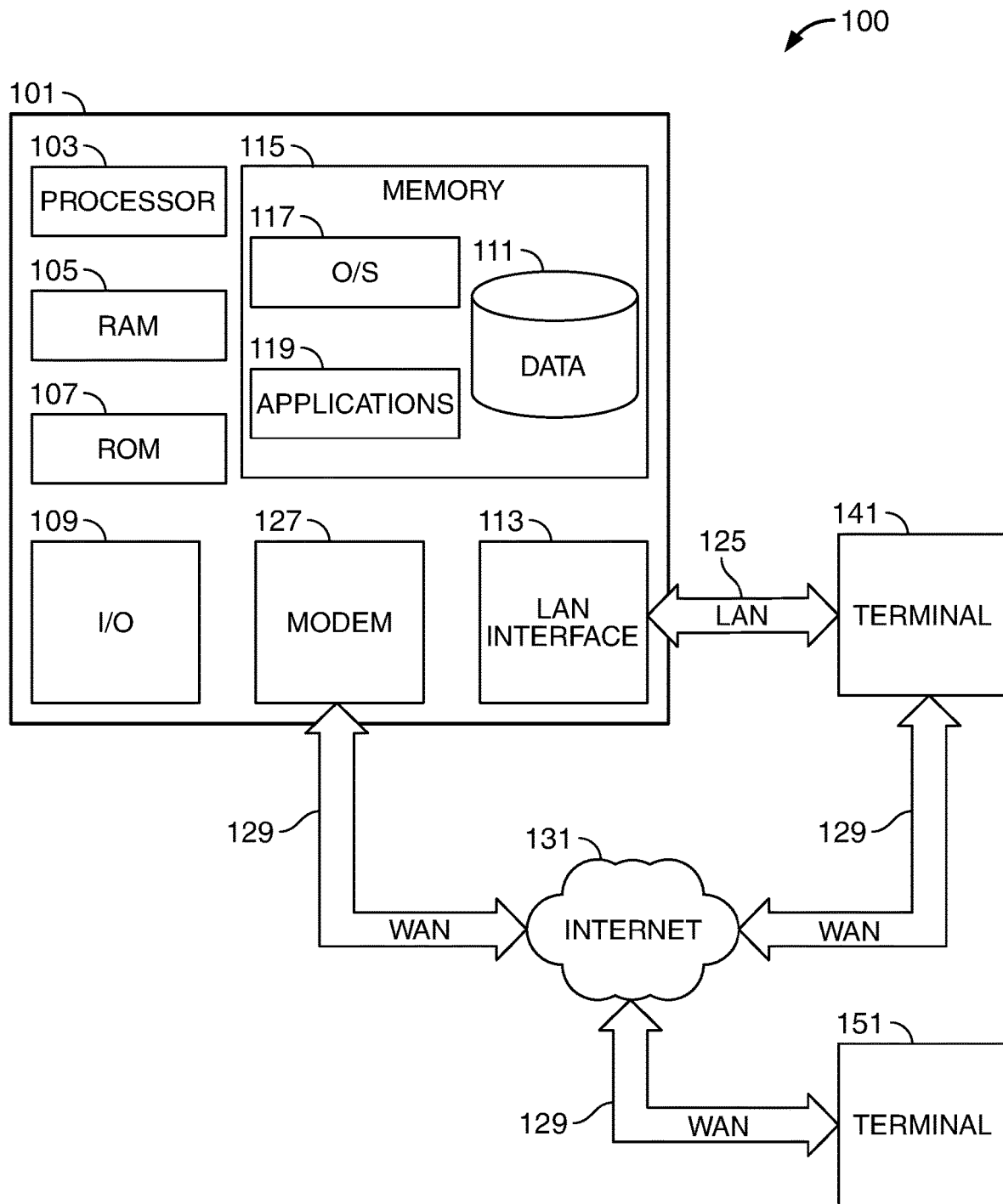
FIG. 1 shows an illustrative system in accordance with principles of the disclosure.

A computational platform, and method for using same, directed to quantum reflection access credentialing (QRAC) is provided. Such a platform preferably captures photons. The photons are generated at a light source. The light source is projected onto a user's face. The platform receives photons reflected from the user's face.

Photons are often referred to as flying quantum bits. This phrase emphasizes both the quantum character of the photons and the photons' ability to carry quantum information between two distant points. See, e.g., Lib, O., Bromberg, Y. Quantum light in complex media and its applications. Nat. Phys. 18, 986-993 (2022). https://doi.org/10.1038/s41567-022-01692-y.

The reflection received from a user's face and/or facial features is unique to every individual. A user-facing device may be used to direct photons to a user's face. The photons directed to the user's face can be reflected therefrom. A user-facing device can include a light source. The light source can shine a consistent, substantially consistent, or periodic beam upon a user's face.

Since each little bit of a user's face is wholly unique, id., this data can be stored, utilized as a key and/or converted into a binary value that, when matched with a "master key" of the light beam (the photons therein containing information), can be used to grant a user access.

Additionally, in keeping with access policy, certain embodiments of user access based on QRAC may involve a secondary measure of security—i.e., two-factor or other multi-factor authentication. In such embodiments, the system authenticating the user to their workspace may involve a secondary authentication measure such as using the light source to also capture the ambient temperature surrounding a potential user.

Such a secondary authentication measure may require a physical presence of a human. Such an embodiment may involve a system that engages a device associated with the user. In some embodiments, the device's central processing unit (CPU) may be run at, for example, maximum capacity—i.e., 100% capacity—for a pre-determined amount of time to measure and record the increase in ambient temperature. Such a secondary authentication measure may ensure the machine and/or user are the entities requesting access. In such an embodiment, when both authentication measures are satisfied, access is granted.

In embodiments in which the photons are delivered to the face using a liquid crystal display (LCD) or other similar and suitable light source, the photons may reflect off the user's face. In certain embodiments, the light source used may utilize neither a screen nor a perceptible light source (radio, infrared, etc.) Some embodiments capture the reflection as quantum laden bits of information rather than nodal points that create a numerical code in a faceprint from current facial recognition.

The shadow and reflection patterns are typically stored in binary notation, and not according to the face shape. Certain embodiments may include measuring the refraction (or the change in trajectory path the light/photon takes when it glances off a user face). In other words, refraction is the phenomenon in which light spreads across vast amounts of water to give the light a blue hue. Alternatively, refraction is the phenomenon in which light passes through a prism. The colors and reflections cast are also unique to a user, and may be determined in line with the embodiments of the invention.

A quantum reflection access credentialing (QRAC) system may include an array of light sources. The system may also include a processor. The processor may be in electrical communication with the array of light sources. The processor may, in response to receiving instructions regarding same, select one or more light sources from among the array of light sources. It should be noted that any single light source may be used to shine light on the user face, or a combination of light sources may be used to shine light on the user's face.

Following the selecting, the processor may initiate an access-credentialing session with a user. The user may be associated with a user face. The initiating may include transmitting light from the selected one of the array of light sources on the user face.

The processor may also receive, from the user face, reflections of the light. After receiving the reflections of the light, the processor may form a user key based on the received reflections and compare the user key to a stored master key. When the user key matches the stored master key, the processor authorizes access for the user.

It should be noted the stored master key may further include a lookup table. The lookup table may include a plurality of user faces, the array of light sources, and, for each user face, information corresponding to a reflection generated by each of the array of light sources.

In some embodiments, selecting one of the array of light sources may be based on a user instruction. In some embodiments, selecting one of the array of light sources may be based on a system-set instruction.

In certain embodiments, the processor may select one or more of the array of light sources based on information contained in the stored master key. In other embodiments, the processor may be further configured to receive, from the user face, refractions of the light.

Prior to authorizing access for the user, the system may require receipt of a second credentialing factor. The second credentialing factor may preferably prevent authorization of access pending receipt and verification of the second credentialing factor. The second credentialing factor may be a measure of the ambient temperature proximal (e.g., within a distance of one centimeter or less) to a central processing unit (CPU) of a mobile device associated with the user. The second credentialing factor may be a measure of the ambient temperature proximal to the user (e.g., within a distance of 2-3 centimeters or less). For the purposes of this application, proximal should be understood to mean within a distance of the user, or the CPU of the device, such that the contribution of the user, or the CPU of the device, sufficiently affects the measure of the temperature as to provide an indication of the identity and/or presence of the person and/or the device.

The light, in some embodiments, may be formed from a plurality of photons. The array of light sources may include at least two of the group consisting of a light emitting diode (LED), an infrared (IR) light, and an incandescent light, or any other suitable light sources that may be used to project light on the user face-either alone or in combination with a second light source.

In some embodiments, a liquid crystal display (LCD) may be used a light filter that is disposed over one or more of the light sources. As such, further permutations of the shining of the light source can be obtained by distorting, using the LCD based filter, the light emanating from the light source. This presents substantially infinite possibilities for implementing digitally controllable distortion of the light shining from the light source.

The following figures and associated written specifications set forth the invention in additional detail to the foregoing.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
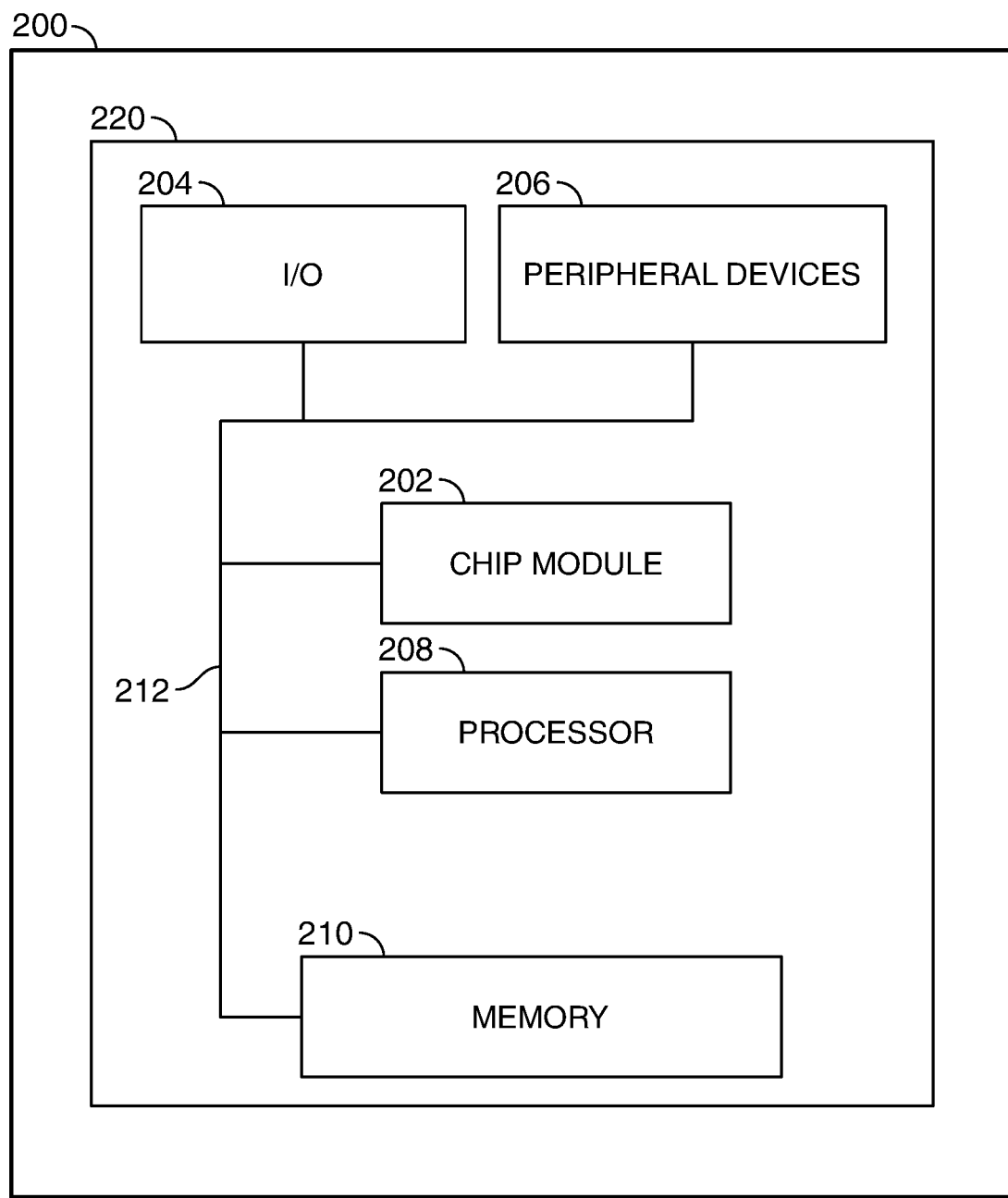
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
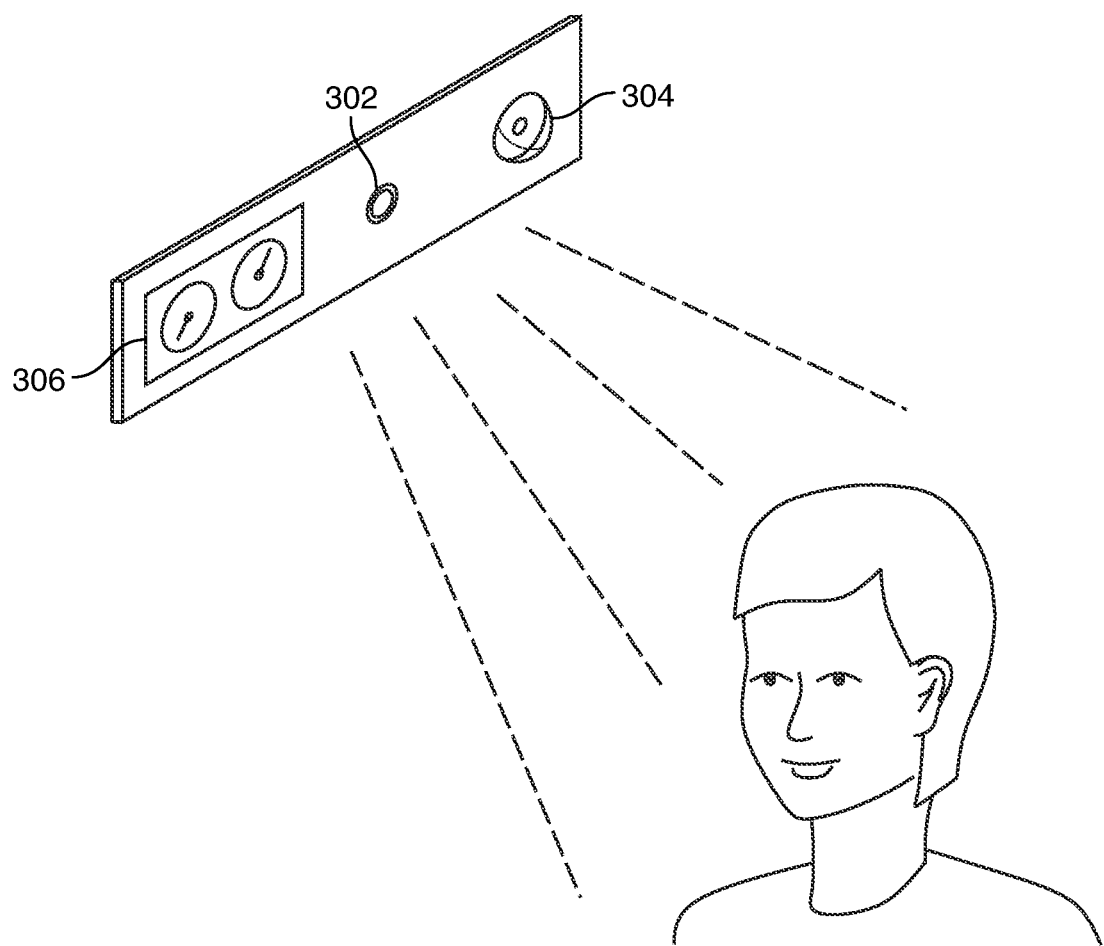
FIG. 3 shows a schematic diagram of an apparatus in accordance with principles of the disclosure.

FIG. 3 shows a schematic diagram of an apparatus in accordance with principles of the disclosure. At 302, a single light source is shown. At 304, a camera is shown for receiving the reflection and/or refraction from the light incident on the user's face. At 306, light controls are shown. These controls may, in certain embodiments, enable the user to control the selection and/or functioning of the light. The controls may be administered by the user or may be internally set by the processor (not shown in FIGS. 3 and 4).

Figure 4:
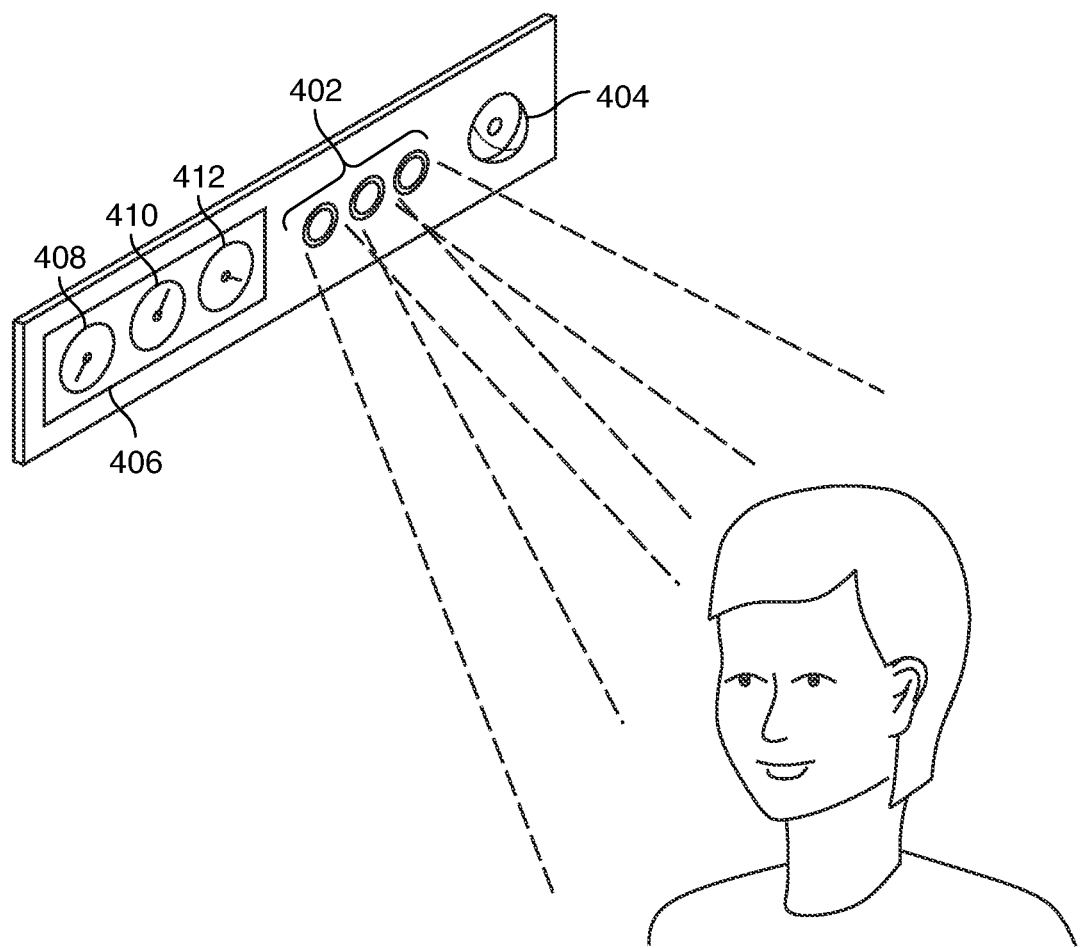
FIG. 4 shows another schematic diagram of another apparatus in accordance with principles of the disclosure.

FIG. 4 shows another schematic diagram of another apparatus in accordance with principles of the disclosure. An array of light sources is shown at 402. It should be noted that light may be emitted from one of the light sources or a combination of more than one of the light sources. At 406, controls 408, 410, and 412, for the light sources are shown.

Figure 5:
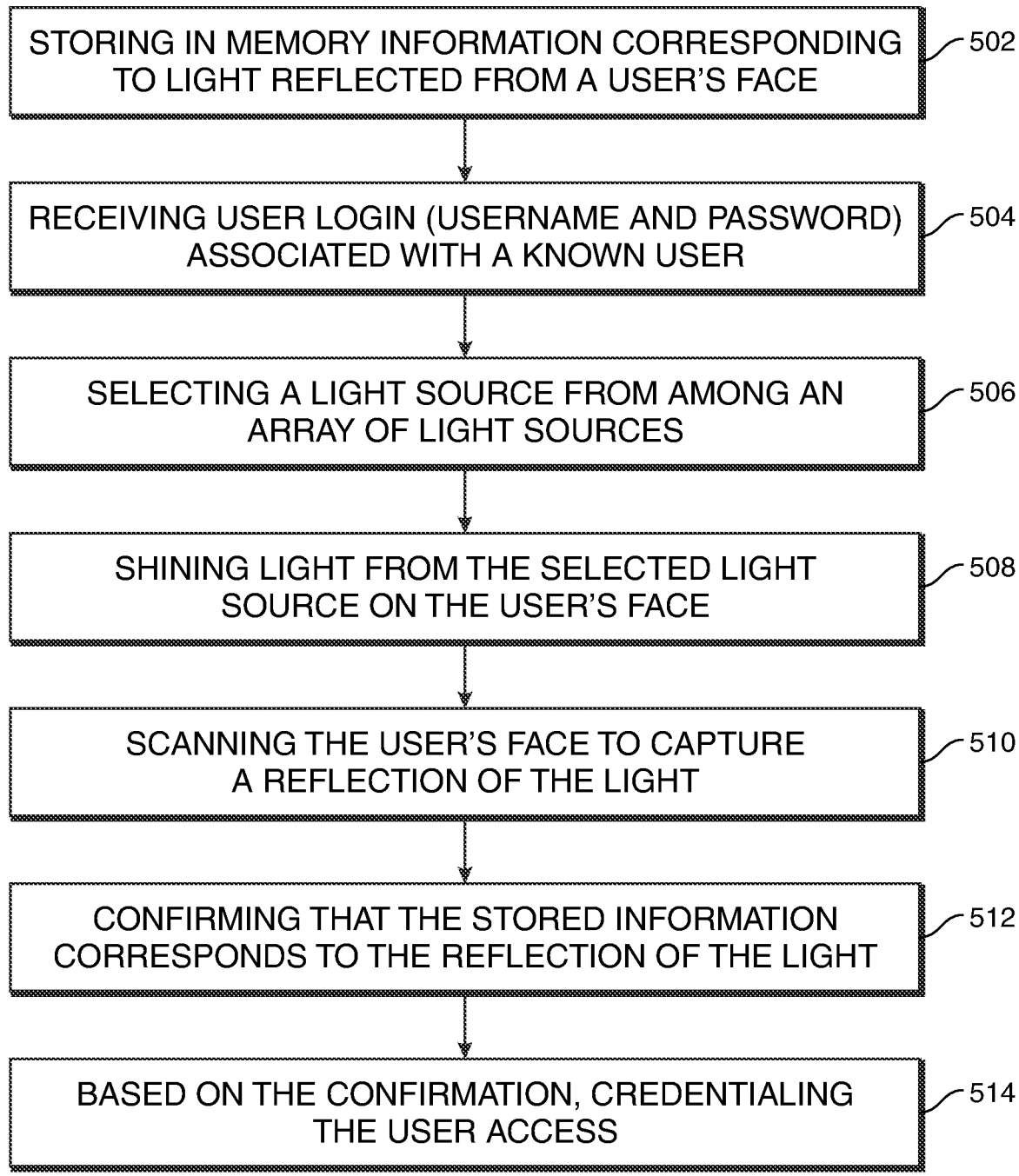
FIG. 5 shows an illustrative flow diagram in accordance with principles of the disclosure.

FIG. 5 shows an illustrative flow diagram in accordance with principles of the disclosure. At 502, the diagram shows storing in memory information corresponding to light reflected from a user face. For each type of suitable light shined on a user's face—e.g., LED, IR, incandescent, whether LCD-filtered or otherwise filtered, etc.—or combination of lights, the memory may store separate information.

At 504, the diagram shows receiving user login information (username and password) associated with a known user. Selecting one or more light sources from among an array of light sources is shown at 506. Then, shining light on the user's face from the one or more selected light sources is shown at 508.

At 510, scanning the user's face to capture a reflection of the light is shown. At step 512, confirming that the stored information corresponds to the reflection of the light is shown. At 514, the user may be provided fully-credentialized user access.

Thus, methods and apparatus for providing QUANTUM REFLECTION ACCESS CREDENTIALING (QRAC) are provided. Persons skilled in the art will appreciate that the present invention can be practiced by other than the described embodiments, which are presented for purposes of illustration rather than of limitation, and that the present invention is limited only by the claims that follow.

What is claimed is:

1. A quantum reflection access credentialing (QRAC) system comprising:
   an array of light sources, wherein the array of light sources includes at least two of the group consisting of a light emitting diode (LED), an infrared (IR) light, and an incandescent light; and
   a processor, in electrical communication with the array of light sources, the processor for selecting the at leasttwo light sources from amongthe array of light sources, wherein the processor is further configured to:
      following the selecting, initiate an access-credentialing session with a user, said user associated with a user face, by transmitting light from the selected one of the array of light sources on the user face;
      receive, from the user face, reflections of the light;
      capture the reflections as quantum laden bits of information;
      form a user key based on the captured quantum laden bits of information;
      compare the user key to a stored master key; and
      when the user key matches the stored master key, authorize access for the user;
   wherein the processor is further configured to, prior to authorizing access for the user, receive a second credentialing factor, said second credentialing factor for preventing authorization of access pending receipt and verification of the second credentialing factor; and
   wherein the second credentialing factor is a measure of the ambient temperature proximal to a central processing unit of a mobile device associated with the user.

2. The system of claim 1, wherein the stored master key further comprises a lookup table, the lookup table comprising a plurality of user faces, the array of light sources, and, for each user face, information corresponding to a reflection generated by each of the array of light sources.

3. The system of claim 1, wherein the processor selecting one of the array of light sources is based on a user instruction.

4. The system of claim 1, wherein the processor selecting one of the array of light sources is based on a system-set instruction.

5. The system of claim 1, wherein the processor selecting one of the array of light sources is based on information contained in the stored master key.

6. The system of claim 1, wherein the processor is further configured to receive, from the user face, refractions of the light.

7. The system of claim 1, wherein the light is formed from a plurality of photons.

8. A quantum refraction access credentialing (QRAC) system comprising:
   an array of light sources; and
   a processor, in electrical communication with the array of light sources, the processor for selecting one of the array of light sources, wherein the array of light sources includes at least two of the group consisting of a light emitting diode (LED), an infrared (IR) light, and an incandescent light, and wherein the processor is further configured to:
      following the selecting, initiate an access-credentialing session with a user, said user associated with a user face, by transmitting light to the user face;
      receive, from the user face, refractions of the light;
      capture the refractions as quantum laden bits of information;
      form a user key based on the captured quantum laden bits of information;
      compare the user key to a stored master key; and
      when the user key matches the stored master key, authorize access for the user;
   wherein the processor is further configured to, prior to authorizing access for the user, receive a second credentialing factor, said second credentialing factor for preventing authorization of access pending receipt and verification of the second credentialing factor; and
   wherein the second credentialing factor is a measure of the ambient temperature proximal to a central processing unit of a mobile device associated with the user.

9. The system of claim 8, wherein the stored master key further comprises a lookup table, the lookup table comprising a plurality of user faces, the array of light sources, and, for each user face, information corresponding to a refraction of the light generated by each of the array of light sources.

10. The system of claim 8, wherein the selecting one of the array of light sources is based on a user instruction.

11. The system of claim 8, wherein the selecting one of the array of light sources is based on a system-set instruction.

12. The system of claim 8, wherein the processor selecting one of the array of light sources is based on information contained in the stored master key.

13. The system of claim 8, wherein the processor is further configured to receive, from the user face, reflections of the light.

14. A method for providing a quantum reflection access credentialing (QRAC) system, the method utilizing a computer processor and one or more non-transitory computer-readable media storing computer executable instructions, the instructions when executed by the computer processor authorize access for a user to a computer network, the method comprising:

receiving a user login, said user login comprising a username and password, said user login associated with a known user, the system comprising a memory for storing information corresponding to light reflected from a face of the user;

selecting a light source from among an array of light sources, wherein the array of light sources includes at least two of the group consisting of a light emitting diode (LED), an infrared (IR) light, and an incandescent light;

shining light generated by the selected light source on the user's face;

scanning the user face to capture a reflection of the light generated by the light source;

capturing the reflections as quantum laden bits of information;

confirming that the information stored in the memory corresponds to the captured quantum laden bits of information; and in response to confirming that the information stored in the memory corresponds to the captured quantum laden bits of information, credentialing user access wherein the processor is further configured to, prior to authorizing access for the user, receive a second credentialing factor, said second credentialing factor for preventing authorization of access pending receipt and verification of the second credentialing factor; and wherein the second credentialing factor is a measure of the ambient temperature proximal to a central processing unit of a mobile device associated with the user.

* * * * *